Oct. 7, 1930.  J. A. YERKES  1,777,539
VALVE CAGE
Filed April 13, 1926
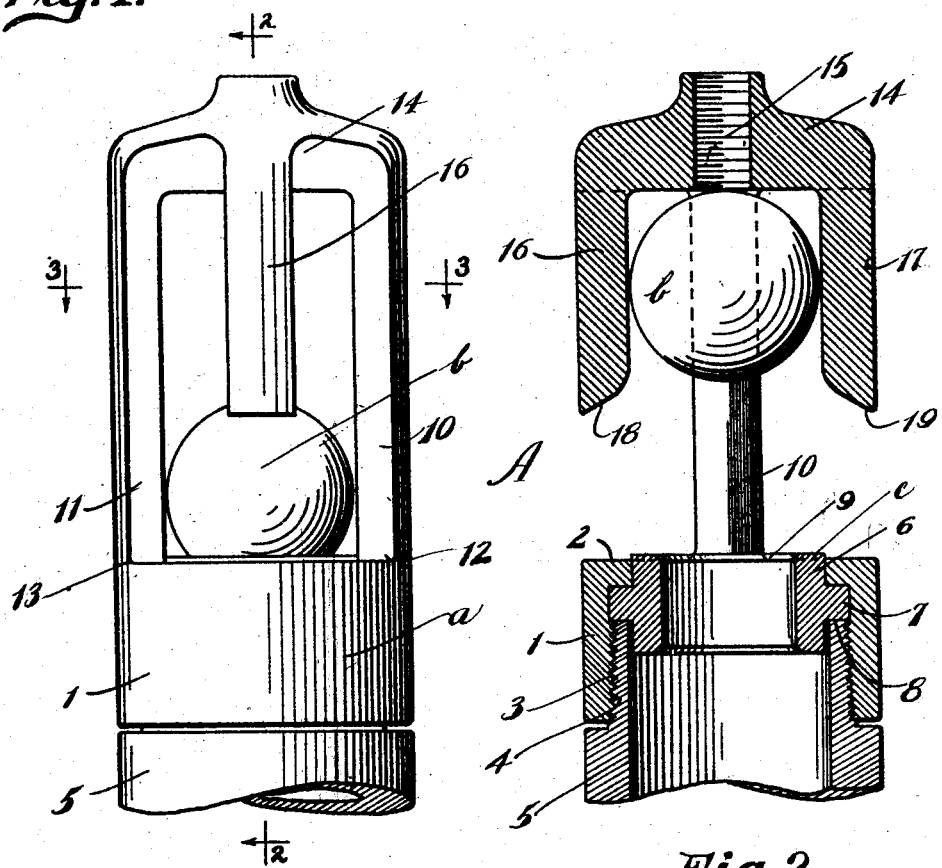
Fig. 1.
Fig. 2.
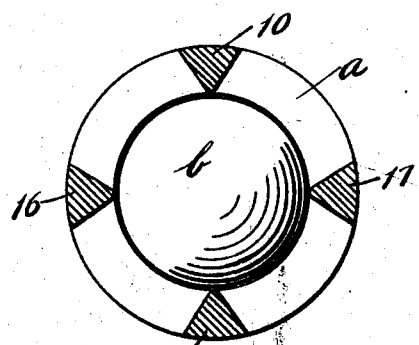
Fig. 3.
INVENTOR,
John A. Yerkes;
BY
ATTORNEYS.

Patented Oct. 7, 1930

1,777,539

UNITED STATES PATENT OFFICE

JOHN A. YERKES, OF LONG BEACH, CALIFORNIA

VALVE CAGE

Application filed April 13, 1926. Serial No. 101,843.

This invention relates to valve cages, and has for an object the provision of a valve cage which, when the valve is opened, will allow ready passage of liquid therethrough with little or no obstruction. It is a prime essential in valves such as are used in oil-well practice that the valve may be opened so that sediment in the oil may readily pass through said valve without clogging the valve, and likewise so that a maximum flow of oil through the valve may be maintained.

Another object is the provision of a valve cage which will leave a large clearance space adjacent the valve seat when the ball member thereof is unseated.

Another object is the provision of a valve cage which is so constructed that deleterious substances such as shale and sand cannot readily lodge against members of such cage and obstruct free operation of the valve if the well is "shut down".

The invention has for further objects the provision of an improved valve cage which will be superior in point of relative simplicity and inexpensiveness, taken in conjunction with utility, durability and general efficiency and serviceability.

With the above and other objects in view, the invention consists in the novel and useful provision, formation, construction, association and relative arrangement of parts, members and features, all as shown in the drawing and finally pointed out in claims.

In the drawing:
Figure 1 is an elevation of the improved valve cage;

Figure 2 is a cross sectional view on the line 2—2 of Figure 1; and,

Figure 3 is a cross sectional view on the line 3—3 of Figure 1.

Corresponding parts in all the figures are designated by the same reference characters.

Referring with particularity to the drawing, the improved valve cage is designated as an entirety by A, and of which $a$ is the crown, $b$ a ball valve, and $c$ a valve seat member, all of which elements are used in practicing one embodiment of the invention. The crown includes an annulus 1 flanged as at 2, and internally threaded as at 3 for engagement on screw threads 4 of a body member 5. The said valve seat member $c$ includes an annulus 6 formed with a peripheral flange 7 adapted to be locked between the top 8 of the body and the flange 2. The valve seat member is beveled as at 9. Two diametrically spaced arms 10 and 11 are joined to the member 1, as shown at 12 and 13. These arms extend upwardly from the member 1 above the flange 2 and are joined by a spider 14 at their top portions. This spider is centrally bored and screw-threaded as shown at 15. Likewise the crown is provided with two other diametrically disposed arms 16 and 17 depending from the said spider. These latter arms are of short length and the spacing between the extremities of such arms 16 and 17 and the top surface of the flange 2 is slightly less than the diameter of the ball valve $b$, and whereby the ball valve is prevented from escaping from between the said arms. Each arm member is triangularly prismatic in cross section, as shown in Fig. 3, with an apex portion of each arm in such a position as to permit a radial line drawn from the center of the valve seat to cut such apices and divide the arms. This construction permits any shale or sand in the oil to readily escape past the valve seat member, and such shale or sand will not clog and prevent free operation of the valve, for the reason that no flat surface is presented.

When the ball valve $b$ is moved upwardly from its valve seat 9 it is prevented from escaping by the arms 10, 11, 16 and 17, and there is free passage for any oil or other liquid through such valve seat, the only obstruction, if any, being the arms 10 and 11, but due to their peculiar construction they present little or no obstruction to the natural flow of the oil or liquid. Furthermore, the ball valve $b$ is prevented from escaping from the crown by all four arms when the ball is in its upward position, as shown in Fig. 2.

The extremities of the arms 16 and 17 are tapered or inclined downwardly, as shown at 18 and 19 so that any tendency for the ball $b$ to move outwardly between the valve seat and such extremities would naturally move the ball valve back between the said arms.

The device is extremely simple of construction and works very efficiently in actual practice, and the large clearance permitted adjacent the valve seat allows ready passage of liquid through the valve.

It is obvious that various changes and modifications may be made in practicing the invention, in departure from the particular showing of the drawing, without departing from the true spirit of the invention.

Having thus disclosed my invention, I claim and desire to secure by Letters Patent:

1. In a device for wells, a crown having an annular base, a pair of arms upwardly extending from said base said arms being diametrically spaced apart, and a second pair of arms secured to the first pair of arms, and equally spaced therefrom, the extremities of said second pair of arms being spaced above the said base.

2. Improvements in valve structures for wells, comprising a valve cage having a crown including an annular base portion, a valve seat at said base portion, a pair of arms extending from said base upwardly, said arms being diametrically spaced apart, a second pair of arms carried by the first pair of arms and equally spaced therefrom, a ball valve adapted to be seated on the valve seat, said second pair of arms having end portions thereof spaced above the base a distance less than the diameter of said ball.

3. Improvements in valve structures for wells, comprising a valve cage having a crown including an annular base portion, a valve seat at said base portion, spaced arms extending from said base to said crown, arms intermediate said first mentioned arms and extending from said crown, a ball valve adapted to be seated on valve seat, the intermediate arms having end portions spaced above the base a distance less than the diameter of said ball valve.

In testimony whereof, I have signed my name to this specification.

JOHN A. YERKES.